United States Patent [19]

Schärer

[11] 4,081,052
[45] Mar. 28, 1978

[54] SAFETY SEAT BELT LOCKING DEVICE FOR VEHICLES

[75] Inventor: Samuel Schärer, Solothurn, Switzerland

[73] Assignee: BEGA A.G., Switzerland

[21] Appl. No.: 657,930

[22] Filed: Feb. 13, 1976

[51] Int. Cl.² .......................................... B60R 21/10
[52] U.S. Cl. ................... 180/82 C; 180/104; 280/744; 200/61.5; 200/61.51
[58] Field of Search ............ 180/82 C, 103 R, 103 A, 180/103 B, 104; 280/744, 735; 340/52 E; 307/10 SB; 200/61.51, 61.48, 61.5

[56] References Cited

U.S. PATENT DOCUMENTS

| 2,020,160 | 11/1935 | Revett | 180/103 A |
| 2,075,040 | 3/1937 | Kieber | 200/61.51 X |
| 3,215,220 | 11/1965 | Schoeffler | 180/82 C |
| 3,311,188 | 3/1967 | Gutshall | 180/82 C |
| 3,644,690 | 2/1972 | Panettieri | 200/61.5 |
| 3,701,903 | 10/1972 | Merhar | 280/735 |
| 3,772,643 | 11/1973 | Dodd et al. | 180/104 |
| 3,961,680 | 6/1976 | Miescher | 180/82 C |

*Primary Examiner*—Joseph F. Peters, Jr.
*Assistant Examiner*—Donn McGiehan
*Attorney, Agent, or Firm*—Berman, Aisenberg & Platt

[57] ABSTRACT

The present invention refers to a safety seat belt locking device for vehicles, comprising a relay with an adjustable time delay, a solenoid device connected to a locking-lever and an impact-responsive switch. If an impact occurs from any direction, which might endanger the passenger, the impact-responsive switch will cause current to be cut off to the solenoid device after a determined time delay, thus releasing the tongue of the safety belt automatically. This device is of particular interest where the car catches fire after a collision, or in similar circumstances, when the passenger should be able to leave the car as quickly as possible.

10 Claims, 3 Drawing Figures

SAFETY SEAT BELT LOCKING DEVICE FOR VEHICLES

BACKGROUND OF THE INVENTION

The present invention relates to a safety seat belt locking device for vehicles, where said locking device is in the primary ignition circuit. This device is particularly suitable for guaranteeing the user better security after a collision than with known safety seat belt locking devices.

The primary object of safety seat belts is to protect a car passenger from being thrown against the windshield of the car in case of a collision or abrupt braking. Generally, belts, in particular three-point-belts, have been well-received by the majority of drivers, and in several countries they are compulsory. The locking part of those belts is generally fixed to the floor of the car or near the bottom on a flexible support.

In some cars the lock is part of an electric circuit in such a way that a signal lamp blinks or the starter cannot be actuated if the belt is not strapped on.

On the other hand, there are situations when a safety seat belt might be disadvantageous or even dangerous. After a collision or similar emergency, it may happen that a passenger cannot free himself from the belt, or that rescuers may encounter great difficulties in freeing such persons from the belts. Moreover, there is often the danger of fire following a collision since the ignition cannot always be turned off in such situations.

U.S. Pat. No. 3,311,188 refers to an automatic opening seat belt fastener which opens when the car tilts at a certain angle, wherein said opening is caused by a mercury switch which closes a circuit, thus activating a coil for releasing the tongue portion of the latching mechanism. Afterwards the circuit is interrupted again. However, this system has some disadvantages. It only works if the position of the automobile exceeds a certain angle of tilt. That is it is, only responsive in those collisions when the automobile tilts over. Further, in order to open the latching mechanism a coil has to be activated, so it will not work automatically, if for some reason the electrical circuit is damaged.

U.S. Pat. No. 3,215,220 relates to a safety seat belt release and ignition cutoff system with which, on the one hand, the buckle device can be opened electrically by actuating a switch and, on the other hand, the circuit can be interrupted by manually opening the buckle device. In case of a collision, the ignition circuit is interrupted automatically. This system also has some disadvantages in that the automatic interruption of the circuit depends on the direction of the impact and it is not meant to open the buckle automatically in case of a collision.

SUMMARY OF THE INVENTION

The general object of the present invention is, in contrast with the foregoing, to provide a locking device which offers great security during and after a collision or similar emergency, which needs no current for unlocking the device and which is simple and easy to manufacture in great quantity.

In order to attain the foregoing and other objects, the locking device according to the invention includes a relay with an adjustable time delay, a solenoid device, said solenoid device being connected to a locking lever and being energized when the ignition is switched on, an impact-responsive switch, said switch closing under the effect of an impact that endangers a person, coming from any direction and actuating said relay, in turo open-circuiting the solenoid device after a determined time delay and thereby causing the release of the tongue of the safety seat belt.

BRIEF DESCRIPTION OF THE DRAWING

Various objects, features and attendant advantages of the present invention will be more fully appreciated as the same becomes better understood from the following detailed description of the present invention when considered in connection with the accompanying drawings, in which.

DESCRIPTION OF THE PREFERRED EMBODIMENTS

Figure 1:
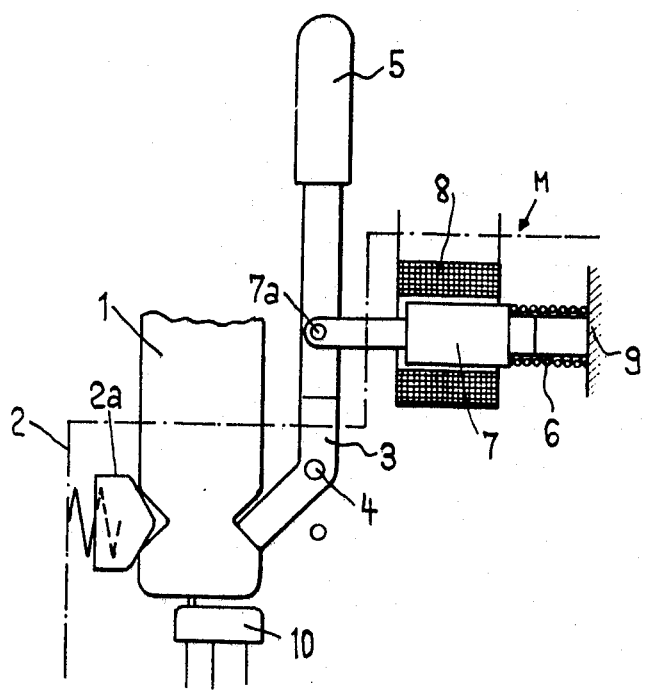
FIG. 1 shows schematically a preferred embodiment of a locking device according to the present invention.

Referring to the drawing, FIG. 1 shows a tongue 1 with two recesses, which is fixed to a flexible strap (not shown), tongue 1 being illustrated in its locked position. The tongue 1 is inserted in a known lock-case 2 with a spring activated stop 2a. A locking-lever 3 is pivotable around an axis 4 which is fastened to the case 2'. The lever 3 can be pivoted manually by a handle 5 as well as by a solenoid device M and a compression spring 6. A plunger or armature 7 of the solenoid device M is swivel-mounted on an axis 7a which is fixed to the locking-lever 3. It will be appreciated that solenoid M has coil 8 which must be constructed in such a way that the plunger 7 which will not effectuate a linear movement, can move freely inside said coil. As will be explained later on, the coil as shown in FIG. 1 is energized so that the magnetized plunger 7 is drawn against a fixed abutment 9. If the current in the coil 8 is interrupted, the plunger 7 becomes demagnetized and the magnetic forces vanish, except for small remnants, so that the compression spring 6 will drive back the plunger 7 and the locking lever 3 therewith, thus releasing the tongue 1 of the belt. Further, the tongue 1 actuates a switch 10 which serves the purpose of signalling if the safety belt is strapped on; in case the belt is not strapped on a signal lamp will blink, for example, or the starter cannot be activated.

Figure 2:
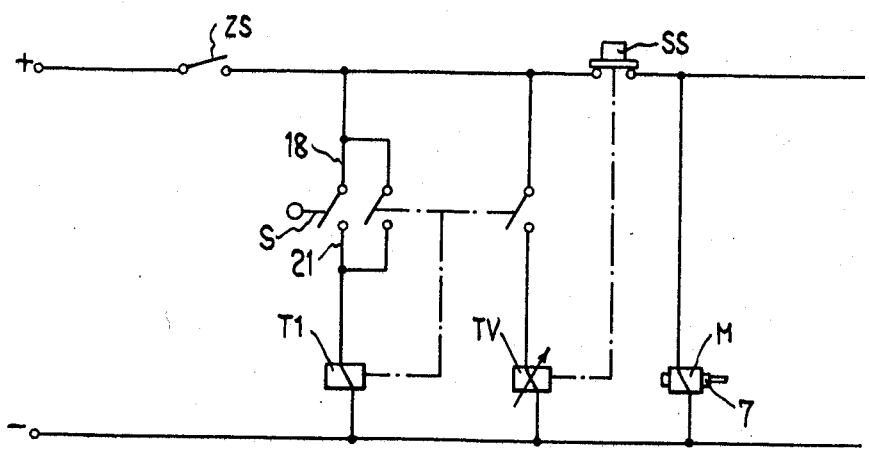
FIG. 2 shows an electrical circuit diagram which may be associated with the preferred embodiment locking device of FIG. 1.

FIG. 2 shows a primary ignition circuit, that is, the circuit which is connected, on the one hand, to a battery source, which circuit can be opened and closed by the ignition lock ZS and which is, on the other hand, in the case of a motor vehicle connected to the starter and ignition. Further, an impact-responsive switch S is provided which is normally open and is connected in series with a first relay T1, the purpose of which is to activate a second relay TV. The time delay of the second relay TV can be adjusted. Relay TV is connected to a security switch SS which can be closed manually after it has been opened and which is connected in series in the primary circuit. This switch SS is connected to the coil 8 of the solenoid device M.

From FIGS. 1 and 2 the operating of the circuit and the locking-device can easily be deduced. If the circuit is closed by the ignition lock ZS, current flows through the coil 8 and the solenoid device M activates the locking lever 3 into the locked position as already disclosed.

If the switch S is now closed, in a manner which will be described later on, the relay T1 is actuated which, in turn, actuates relay TV. After a determined and adjustable time delay relay TV actuates the security switch SS which opens and interrupts the primary circuit as well as the current to the coil 8. In order to restore the preceding state the pushbutton of the security switch has to be pushed in.

Figure 3:
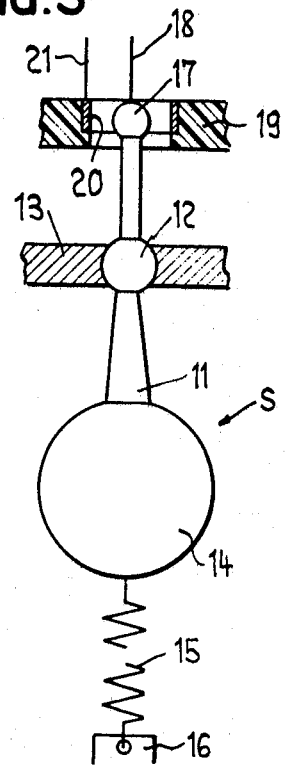
FIG. 3 shows schematically a preferred embodiment of an impact-responsive switch of the present invention.

A preferred form of the impact-responsive switch S which initiates the interruption of the primary circuit and the unlocking of the locking lever is shown is FIG. 3. Switch 5 comprises a pendulum-like lever 11 on which a ball joint 12 with its bearing 13 is fixed, said bearing 13 being fixed to a solid part of the vehicle. On one end of the lever 11 a weight 14 is mounted as a flywheel mass, which weight is connected to a spring which is fixed to a stationary part 16 of the vehicle. The other end of the lever 11 is provided with an electrically conducting ball 17 which is connected by means of a conductor 18 to the circuit of FIG. 2. Around this ball 17 is a metallic cylinder 20 which is embedded in an electrically insulated body 19 and provided with a conductor 21 for connecting it to the circuit of FIG. 2.

Now, if the switch S receives an impact of at least a predetermined amplitude, weight 14 will swing out, the ball 17 will contact the cylinder 20 and thus connect the conductor 18 with the conductor 21, closing switch S.

By choosing spring 15, the mass of the weight 14 and the proportion of the lever-arms 1 it is possible to determine a threshold for the force of an impact with which contact will be effectuated between the ball 17 and the cylinder 20. It can easily be seen that with the appropriate suspension of the lever, impacts from all directions, for an improbable impact in the exact axial direction, will actuate the switch S so that in practically all collisions or similar emergencies said switch S becomes closed.

With the present locking device it is thus possible that the safety seat belt will be disengaged automatically a determined time delay after a collision or a similar emergency situation of any kind. It is important to recall that this disengagement is effectuated while the current flow is interrupted, particularly the case when the current is interrupted first. From this stems, as another advantage, the fact that if the circuit is opened by means of the ignition key, the belt will be disengaged without any manual help. On the other hand, it is always possible to unlock the belt manually, contrary to the force of the switched on solenoid device.

However, the idea of the invention is not restricted to the above-mentioned embodiment. Thus, it is possible to employ as an impact-responsive element a piezaelectric acceleration meter or even several meters instead of the pendulum-like lever, the voltage of which, delivered beyond a determined threshold as a result of an impact, can be used for triggering the disengagement.

The electromagnetic locking can also be effectuated in other ways.

Obviously, numerous modifications and variations of the present invention are possible in light of the above teachings. It is therefore to be understood that within the scope of the appended claims the invention may be practiced otherwise than as specifically described herein.

What is claimed:

1. A safety seat belt locking device for vehicles having an electrical primary ignition circuit, said locking device comprising:

a locking lever for retaining said seat belt in a locked position;

a solenoid device connected to said locking lever and energized when the ignition is turned on for maintaining said locking lever in its seat belt retaining position;

a relay connected to said solenoid and having an adjustable time delay;

a switch responsive to an impact to said vehicle from substantially any direction for energizing said relay and deenergizing said solenoid device so as to disengage said locking lever from its seat belt retaining position and unlock said safety seat belt; and a security switch connected to said relay in such a way that the primary circuit is interrupted simultaneously with the unlocking of said safety seat belt.

2. A safety seat belt locking device according to claim 1, wherein said switch responsive to an impact comprises a lever suspended in a ball joint, one end of said lever connected to a fly-wheel mass connected to a spring, the other end of said lever connected to a ball-shaped contact, such that upon an impact having a predetermined force said lever will swing out and said ball-shaped contact will close a circuit between two conductors connected to said primary circuit.

3. A safety seat belt locking device according to claim 1, wherein said switch responsive to an impact comprises at least one piezoelectric accelerometer.

4. A safety seat belt locking device for a vehicle that has an electrical primary ignition circuit, which comprises:

lever means normally biased to unlock said seat belt;

solenoid means connected to said lever means and responsive to the energization of said primary ignition circuit for overcoming the normal bias of said lever means so as to lock said seat belt; and switch means responsive to an impact to said vehicle from substantially any direction for open circuiting said primary ignition circuit and said solenoid means so as to unlock said seat belt after a time delay;

said switch means including a weight suspended in an equilibrium position regardless of the orientation of the vehicle, said weight moving in response to said impact for actuating said switch means.

5. The safety seat belt locking device as set forth in claim 4, wherein said switch means further comprises a lever to one end of which is connected said weight to the other end of which is connected a first electrical contact.

6. The safety seat belt locking device as set forth in claim 5, wherein said lever is pivotally suspended between its ends.

7. The safety seat belt locking device as set forth in claim 6, further comprising spring means connecting said weight to said vehicle, and a second electrical contact that surrounds said first electrical contact.

8. The safety seat belt locking device as set forth in claim 7, wherein said first and second electrical contacts are normally open, said impact serving to close same.

9. The safety seat belt locking device as set forth in claim 4, further comprising relay means connected between said switch means and said solenoid means for imparting said time delay to the de-energization of said solenoid means.

10. Apparatus, which comprises:

electrical switch means comprising an elongated, normally substantially vertically oriented lever having an upper end and a lower end, said lever pivotally mounted to a first rigid member at a position between said upper and lower ends, said upper end comprising a first electrical contact, said lower end comprising a weight for orienting said lever in a vertical equilibrium position, further comprising spring means connecting said weight to a second rigid member, and a second electrical contact that is mounted in a third rigid member and which surrounds said first electrical contact, said first and second electrical contacts being normally open when said lever is in said equilibrium position, an impact to said first, second or third rigid members serving to close said first and second electrical contacts and thereby actuate said switch means.

* * * * *